(12) United States Patent
Pisha et al.

(10) Patent No.: US 12,388,841 B2
(45) Date of Patent: *Aug. 12, 2025

(54) SYSTEM AND METHOD FOR THREAT DETECTION ACROSS MULTIPLE CLOUD ENVIRONMENTS UTILIZING NORMALIZED EVENT LOGS

(71) Applicant: Wiz, Inc., New York, NY (US)

(72) Inventors: George Pisha, Giv'atayim (IL); Liran Moysi, Kfar Saba (IL); Itay Vanzetti, Petah Tikva (IL); Alon Schindel, Tel Aviv (IL)

(73) Assignee: Wiz, Inc., New York, NY (US)

( * ) Notice: Subject to any disclaimer, the term of this patent is extended or adjusted under 35 U.S.C. 154(b) by 180 days.

This patent is subject to a terminal disclaimer.

(21) Appl. No.: 17/816,598

(22) Filed: Aug. 1, 2022

(65) Prior Publication Data
US 2024/0039929 A1    Feb. 1, 2024

(51) Int. Cl.
*H04L 29/06* (2006.01)
*H04L 9/40* (2022.01)

(52) U.S. Cl.
CPC ........ *H04L 63/1416* (2013.01); *H04L 63/102* (2013.01)

(58) Field of Classification Search
CPC ............. H04L 63/1416; H04L 63/1425; H04L 63/102; H04L 63/1433; H04L 63/1441
See application file for complete search history.

(56) References Cited

U.S. PATENT DOCUMENTS

| | | | | |
|---|---|---|---|---|
| 7,219,239 | B1 * | 5/2007 | Njemanze | H04L 63/0218 726/21 |
| 10,411,975 | B2 * | 9/2019 | Martinez | H04L 41/40 |
| 10,798,132 | B2 * | 10/2020 | Chen | H04L 63/0876 |
| 10,917,439 | B2 * | 2/2021 | Purathepparambil | H04L 63/145 |
| 11,019,101 | B2 * | 5/2021 | Narayanaswamy | H04L 63/104 |
| 2014/0280961 | A1 * | 9/2014 | Martinez | H04L 41/40 709/226 |
| 2015/0172321 | A1 * | 6/2015 | Kirti | H04L 63/1416 726/1 |
| 2017/0264619 | A1 * | 9/2017 | Narayanaswamy | H04L 63/104 |
| 2018/0027006 | A1 * | 1/2018 | Zimmermann | H04L 63/0227 726/11 |
| 2018/0351978 | A1 * | 12/2018 | Preizler | H04L 41/142 |

(Continued)

*Primary Examiner* — Dao Q Ho
(74) *Attorney, Agent, or Firm* — M&B IP Analysts, LLC (57) ABSTRACT

A system and method improves cloud detection and response by generating a normalized event log from a plurality of cloud service providers (CSPs). The method includes receiving a plurality of events, wherein a first event of the plurality of events is generated in a cloud computing environment provided by a first CSP and a second event of the plurality of events is generated in a cloud computing environment provided by a second CSP; extracting data from an event of the plurality of events; generating a normalized event based on the extracted data and a predefined data schema, the predefined data schema including a plurality of data fields; storing the normalized event in a transactional database having stored therein a normalized event log; and applying a rule from a rule engine on a normalized event stored in the transactional database to detect a cybersecurity threat in any of the CSPs.

19 Claims, 5 Drawing Sheets

(56) References Cited

U.S. PATENT DOCUMENTS

| | | | |
|---|---|---|---|
| 2019/0130009 A1* | 5/2019 | McLean | G06F 40/205 |
| 2019/0245892 A1* | 8/2019 | Chen | H04L 63/20 |
| 2020/0021620 A1* | 1/2020 | Purathepparambil | H04L 63/102 |
| 2020/0089885 A1* | 3/2020 | Kling | G06F 21/566 |
| 2020/0204465 A1* | 6/2020 | Baker | G06F 11/0709 |
| 2023/0114821 A1* | 4/2023 | Thomas | H04L 63/1433 726/23 |

* cited by examiner

SYSTEM AND METHOD FOR THREAT DETECTION ACROSS MULTIPLE CLOUD ENVIRONMENTS UTILIZING NORMALIZED EVENT LOGS

TECHNICAL FIELD

The present disclosure relates generally to cybersecurity threat detection, and specifically to cybersecurity threat detection across multiple cloud platforms.

BACKGROUND

Cloud computing infrastructures, such as Amazon® Web Services (AWS), Microsoft® Azure, Google® Cloud platform, and the like, provide many computing advantages. Namely, the ability to flexibly control the amount of compute resources an organization requires and only pay for an actual resource used, is a significant advantage, when the alternative has been that an organization would pay for a server, for example, lease or buy real estate to physically house that server, and continuously pay for maintenance, such as IT services, electricity, and the like, whether that server was in use or not.

Each cloud computing infrastructure offers and delivers services which are different from others, as naturally occurs in most markets where competitors have different offerings at different price points. It is therefore not unusual for an organization to deploy multiple cloud computing environments across cloud computing infrastructures, in order to better take advantage of the offerings provided by each cloud computing infrastructure. For example, an organization may utilize Azure for an organizational knowledge base, and utilize AWS to provide a service, such as a web server backend.

Managing multiple cloud environments quickly becomes challenging, as more of the organization utilizes different aspect of different cloud computing infrastructures. Even a relatively small deployment may include thousands of users, and hundreds of resources, all of which may be spun up or down based on unforeseeable demand. Many cybersecurity risks may likewise present themselves as a result of this, especially when an organization has a portion of a cloud computing infrastructure which is used internally and should not be publicly expose, and a portion of their infrastructure needs to be publicly exposed (such as the web server of the above example).

Solutions which address a single cloud computing infrastructure may be effective for that particular infrastructure, but they do not communicate with other cloud computing infrastructures. Such solutions require that each cloud computing environment deployed on a different infrastructure have its own solution, and each such solution needs to be managed independently.

Cloud detection and response (CDR) solutions attempt to detect and provide a response to cybersecurity threats, sometimes as part of attack surface management (ASM). Certain CDR solutions attempt to detect cybersecurity threats by reading event logs and performing anomaly detection thereon. Increasingly, as event logs and data sets grow larger, these CDR solutions utilize machine learning (ML) and artificial intelligence (AI) solutions. However, such solutions carry with them significant drawbacks. For example, an AI model may change its output based on processing an input, so that if the same input is provided twice, the first time may yield a result which is different from the second time the input is provided. This is clearly a problem if a cybersecurity threat is not detected consistently.

Furthermore, AI and ML solutions are not transparent. It is not usually possible to trace a decision tree which caused a certain input to generate a certain output. While this may aid in anomaly detection, it makes adjusting the models for false positive detection and false negative detection more difficult.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for improving cloud detection and response (CDR) by generating a normalized event log from a plurality of cloud service providers (CSPs). The method comprises: receiving a plurality of events, wherein a first event of the plurality of events is generated in a cloud computing environment provided by a first CSP and a second event of the plurality of events is generated in a cloud computing environment provided by a second CSP; extracting data from an event of the plurality of events; generating a normalized event based on the extracted data and further based on a predefined data schema, the predefined data schema including a plurality of data fields; storing the normalized event in a transactional database having stored therein a normalized event log; and applying a rule from a rule engine on a normalized event stored in the transactional database to detect a cybersecurity threat in any of the plurality of CSPs.

Certain embodiments disclosed herein also include a non-transitory computer readable medium having stored thereon causing a processing circuitry to execute a process, the process comprising: receiving a plurality of events, wherein a first event of the plurality of events is generated in a cloud computing environment provided by a first CSP and a second event of the plurality of events is generated in a cloud computing environment provided by a second CSP; extracting data from an event of the plurality of events; generating a normalized event based on the extracted data and further based on a predefined data schema, the predefined data schema including a plurality of data fields; storing the normalized event in a transactional database having stored therein a normalized event log; and applying a rule from a rule engine on a normalized event stored in the transactional database to detect a cybersecurity threat in any of the plurality of CSPs.

Certain embodiments disclosed herein also include a system for improving cloud detection and response (CDR) by generating a normalized event log from a plurality of cloud service providers (CSPs). The system comprises: a processing circuitry; and a memory, the memory containing instructions that, when executed by the processing circuitry, configure the system to: receive a plurality of events, wherein a first event of the plurality of events is generated in a cloud computing environment provided by a first CSP and a second event of the plurality of events is generated in a cloud computing environment provided by a second CSP; extract data from an event of the plurality of events; generate a normalized event based on the extracted data and further based on a predefined data schema, the predefined data schema including a plurality of data fields; store the normalized event in a transactional database having stored therein a normalized event log; and apply a rule from a rule engine on a normalized event stored in the transactional database to detect a cybersecurity threat in any of the plurality of CSPs.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for normalizing event logs across multiple cloud platforms provided by cloud service providers (CSPs). A cloud service provider (CSP) provides cloud services from a single cloud computing infrastructure. A cloud computing infrastructure deployed on a cloud computing infrastructure generates event logs, for example through the environment itself, via operating systems deployed in the environment, applications deployed in the environment, and workloads, such as virtual machines, containers, and serverless functions which may each generate event logs corresponding to actions in the cloud computing environment.

CSPs may not wish to natively provide a solution which is able to communicate across multiple platforms as it would require a CSP to integrate, at least on some level, with a competitor platform. However, from an organization's perspective, which utilizes multiple offerings from different CSPs, it is advantageous to be able to have a single, unified, event log, where events from all the multiple CSPs are provided for easy viewing, and where rules and controls can be applied equally and consistently.

A normalized event log allows to accurately represent a status of an organization's entire networked solution. Furthermore, such a normalized log can be used for applying a unified rule engine on the events of the normalized log. This is particularly advantageous as it allows applying a single rule across multiple cloud platforms, rather than have to maintain a different rule engine for each platform, ensure those rules are all compatible, and ensure that such compatibility is also cross platform. In certain embodiments, the normalized log is generated based on a unifying data schema. The data schema specifies, in an embodiment, a data structure for storing an event in a log. In some embodiments, the data schema further includes a rule to generate a normalized log entry from a log entry of a specific cloud computing infrastructure. In an embodiment log events are received from a queue of a cloud computing infrastructure by an event log normalizer ("normalizer") is configured to parse an event, extract data from the received event, and generate a normalized log event based on the extracted data and a predefined data schema.

It is recognized in this regard that entering data into a log is an activity that can be performed by a human. However, a human is incapable of receiving events at a speed at which a cloud computing environment generates them. The time required by a human to manually input each event and normalize each event based on the predefined data schema would make the normalized log impractical, as the information would likely not be relevant. Furthermore, a human operator would be required to apply data schema rules consistently to many different types of events received from different cloud environments. Where the rules are not applied consistently and a discrepancy occurs, the normalized event log does not accurately reflect the status of the cloud computing environment, thereby rendering the log ineffective. The disclosed embodiments provide a system which is configured to consistently apply a predefined data schema on events received from multiple cloud computing environments. The system is further configured to supply the normalized event log to a unified rule engine which applies rules, controls, and the like, on the events of the normalized event log, for example to detect a cybersecurity threat. As the predefined data schema is applied consistently on the received events, the rule engine is likewise applied consistently on the generated normalized event log.

Figure 1:
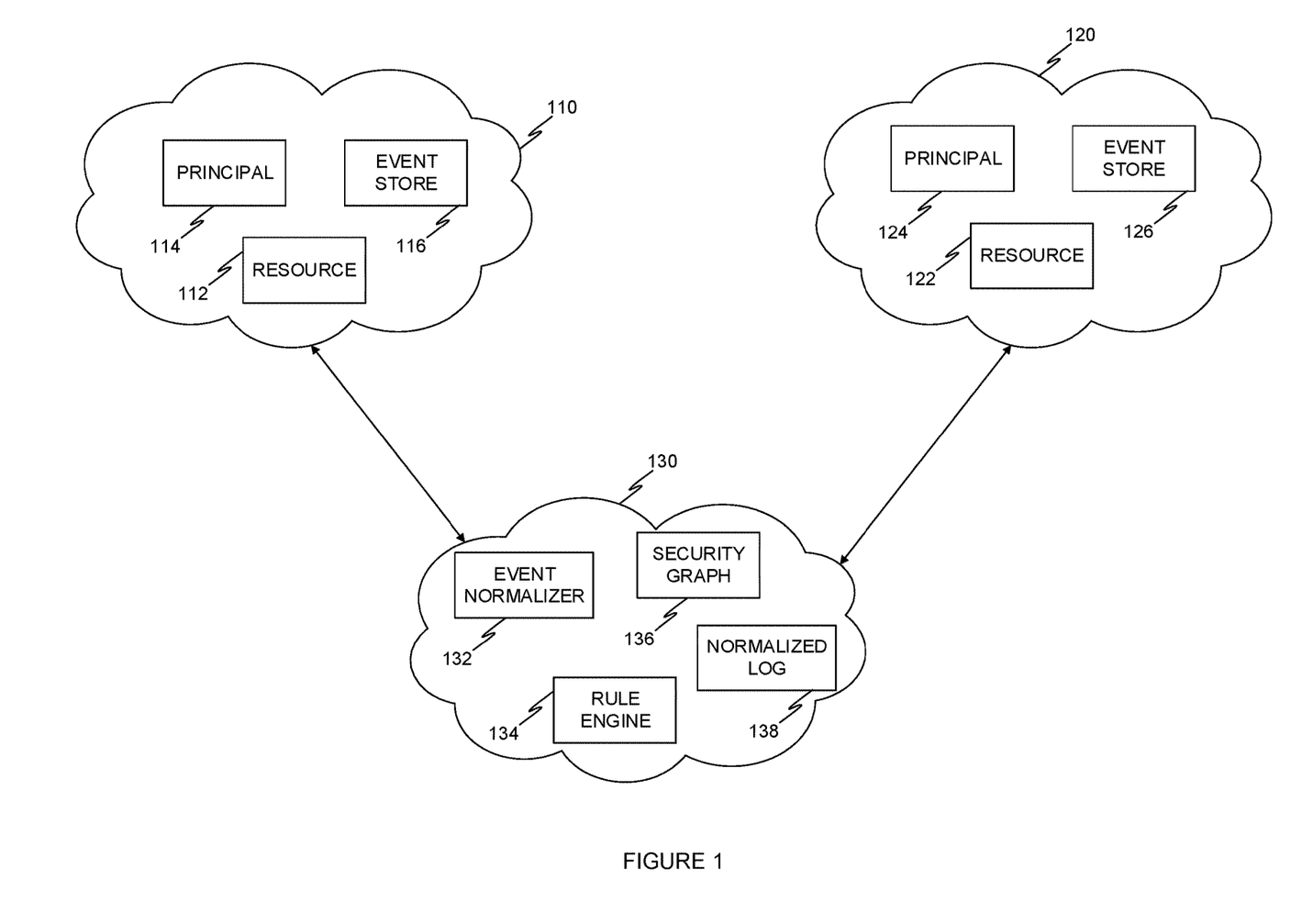
FIG. 1 is a diagram of a multiple cloud computing environments connected to an inspection environment, implemented in accordance with an embodiment.

FIG. 1 is an example diagram of a multiple cloud computing environments connected to an inspection environment, implemented in accordance with an embodiment. A first cloud computing environment 110 and a second cloud computing environment 120 (generally referred to as a cloud computing environment) are each connected to an inspection environment 130.

In an embodiment, a cloud computing environment may be implemented as a virtual private cloud (VPC) on a cloud computing infrastructure, also known as a cloud service provider (CSP). A cloud computing infrastructure may be, for example, Amazon® Web Services (AWS), Google® Cloud Platform (GCP), Microsoft® Azure, and the like. A cloud computing environment includes, in an embodiment, a plurality of resources and principals.

For example, the first cloud computing environment 110, which is deployed on a first cloud computing infrastructure, includes a first resource 112, a first principal 114, and a cloud infrastructure-specific event store 116. The event store 116 is implemented, in an embodiment, as a database for storing events, which correspond to actions performed in the first cloud computing environment 110. For example, if the first principal 114 accesses the first resource 112, such an access is logged as an event and the event is stored in the event store 116. In an embodiment, the event store 116 is configured to store events based on a predefined data schema which is unique to a cloud computing infrastructure on which the first cloud computing environment 110 is deployed. For example, the event store 116 may be realized utilizing Apache® Kafka®.

In an embodiment, the first resource 112 is a hardware provisioned by the cloud computing environment, such as a processor, a memory, a storage, and the like. In certain embodiments, the first resource 112 is a virtual workload, such as a virtual machine, a container, a serverless function, and the like. A resource is a cloud entity which provides a service or provisions access to hardware.

In some embodiments, a principal 114 is a user account, service account, role, and the like. A principal is a cloud entity which is authorized to act on a resource, initiate actions in a cloud computing environment, and the like. In certain embodiments, a cloud entity is both a resource respective of some principal, and a principal respective of some resource. For example, a load balancer may be a resource from the perspective of a user account, and a principal from the perspective of a web server which is accessed by the load balancer.

As another example, the first resource 112 may be a virtual machine deployed in a GCP cloud computing environment. The virtual machine is configured to access a Cloud Logging application programming interface (API) and generate an event by providing data which is then recorded as an event in a log, through a specified sink. The data is received by the Cloud Logging API and routed to a sink according to the specification provided by the virtual machine. In an embodiment, a sink is associated with a cloud resource. A sink routes a log event to a log bucket. In an embodiment, a log bucket is a virtual storage. In certain embodiments, a service account is generated in a cloud computing environment for each sink, and the service account initiates writing of log events to the sink associated with the service account.

The second cloud computing environment 120 includes a second resource 122, a second principal 124, and a second cloud computing infrastructure-specific event store 126. In an embodiment, the second computing environment 120 is deployed on a cloud computing infrastructure which is different from the cloud computing infrastructure of the first cloud computing environment 110. For example, the first cloud computing environment 110 is deployed on AWS, while the second cloud computing environment 120 is deployed on Azure. While both the first event store 116 and the second event store 126 may be implemented using, for example, Apache® Kafka®, each is configured to generate events which are specific to the cloud computing infrastructure on which their respective cloud computing environments are deployed. In an embodiment, an event is a data record which corresponds to an action initiated in a cloud computing environment. For example, accessing a resource, adding a principal, associating a principal with a privilege, spinning up a machine, spinning down a machine, writing to a bucket, extracting an image from a repository, and the like, are all examples of actions initiated in a cloud computing environment. Each such action can be recorded as an event. In an embodiment, an event includes an identifier which corresponds to the action (e.g., a descriptor of that action) and a time stamp. In certain embodiments, an event may further include: a resource identifier, a user account identifier, a service account identifier, an action identifier, a network address, a namespace identifier, a time stamp, additional information field, an identifier of a cloud computing environment, an identifier of a cloud computing infrastructure, and the like.

The first cloud computing environment 110 and the second cloud computing environment 120 are each connected to an inspection environment 130. The inspection environment 130 is, in an embodiment, a cloud computing environment deployed on a cloud computing infrastructure. In certain embodiments, the cloud computing infrastructure of the inspection environment 130 is the same as either the first cloud computing environment 110 or the second cloud computing environment 120. In some embodiments, the inspection environment 130 is deployed as a VPC on a cloud computing infrastructure, such as GCP.

In an embodiment, the inspection environment 130 includes a log normalizer 132, a rule engine 134, a security graph 136, and a normalized event log 138. In some embodiments, a unifying data schema is stored, for example, as a schema of a database, on which the normalized event log 138 is stored. While the elements of the inspection environment 130 are shown as individual elements in a single environment, it should be understood that this is merely one possible implementation according to an embodiment, and other implementations, utilizing other elements, may be equally realized.

A log normalizer 132 is configured to receive events from multiple cloud computing environments 110 and 120. The first cloud computing environment is different from a second cloud computing environment. For example, in an embodiment the log normalizer 132 is configured to receive a first plurality of events from the first event store 116, and a second plurality of events from the second event store 126. In some embodiments, the log normalizer 132 is configured to pull events from an event stream generated by a cloud computing environment. In an embodiment, the log normalizer 132 is configured to pull events from a plurality of event streams. A first event stream is generated from a first cloud computing environment, and a second event stream is generated from a second cloud computing environment. The second cloud computing environment is deployed on an infrastructure which is different from an infrastructure on which the first cloud computing environment is deployed. In certain embodiments, the log normalizer 132 is configured to receive a plurality of events from an event queue of each of a plurality of cloud computing environments.

In an embodiment, the log normalizer 132 is configured to extract data from an event, and store the event as a normalized event in a normalized event log 138. In certain embodiments, the log normalizer 132 is further configured to store an event in a normalized event log 138 based on a predefined data schema. In an embodiment, extracted data includes a resource identifier, a user account identifier, a service account identifier, an action identifier, a network address, a namespace identifier, a time stamp, additional information field, and the like. In certain embodiments, the normalized event may be generated further based on an identifier of a cloud computing environment, an identifier of a cloud computing infrastructure, and the like. In an embodiment, a normalized event is a data record which is generated based on a received event and a predefined data schema.

A rule engine 134 is configured to apply a condition on an event. For example, a rule may include a trigger, a condition, and an action. In an embodiment, a trigger is a keyword, a combination of keywords, a succession of events, and the like, which, when satisfying a condition, cause an action to be initiated. For example, a rule may specify that an alert should be generated if an event is detected in which a user is given administrator privilege. In an embodiment, the rule engine is configured to apply a rule on a normalized event to detect a cybersecurity threat. In certain embodiments, detection includes triggering a condition of the rule, by determining that a value of a data field of the normalized event matches the condition. For example, the condition may be based on the age of user account. A condition may check if the user account is new (e.g., has an age of less than five minutes). An event which has a data field that corresponds to an age of a user account, and the data field has a value of three minutes, would trigger the condition of the rule.

A rule engine 134 which is applied to a normalized event log 138 is de facto applied to events from multiple cloud environments. Thus, rules and controls can be generated which are applied equally across multiple cloud computing environments. In an embodiment, a rule is used to detect an event, while a control is used to ensure an active response is initiated in response to a rule being triggered. This is advantageous, as it reduces a redundancy in generating, for example, a similar rule for each cloud computing environment. Furthermore, when a rule is updated it is updated across all cloud computing environments. Having redundancies of the same rule for different cloud computing environments carries a risk that when such rules are updated, they may be updated for some, but not all, cloud computing environments, thus creating a potential cybersecurity risk by having a gap between how an administrator believes their cloud computing environment is defined, to how it is defined in practice. An attacker may take advantage of such a gap and gain illicit access to a cloud computing environment.

In an embodiment, the inspection environment 130 further includes a security graph 136. A security graph 136 is utilized to represent a cloud computing environment in a graph database which is configured to store therein the security graph 136. In an embodiment, the security graph 136 may include a predefined data schema to store cloud entities, such as principals, resources, and the like as nodes in the security graph 136. The predefined data schema may be applied to unify a representation, so that a principal from a first cloud computing environment and a principal from a second cloud computing environment would be each represented by a principal node according to the predefined data schema in the security graph 136. In an embodiment, an event may be connected to a resource, a principal, or both, of a cloud computing environment. For example, a security graph may be queried to detect nodes which are connected to a node representing a resource for which a normalized event was generated. An example of a method for generating a security graph is discussed in further detail in U.S. Non-Provisional patent application Ser. No. 17/524,410, the entire contents of which are hereby incorporated by reference.

In certain embodiments, a cybersecurity threat may be detected based on the normalized event. For example, a cross-cloud platform access may be detected. For example, a service account from a first cloud computing environment may assume a role in a second cloud computing environment and generate a new user account having administrator privileges. A normalized event corresponding to a new user account having administrator privileges can be defined as a cybersecurity threat. In an embodiment, the security graph 136 is traversed to detect a node which corresponds to an identifier extracted from the normalized event. For example, an identifier may be an identifier a cloud entity, such as an identifier of a user account, service account, resource, and the like. In some embodiments, a node representing the cloud entity may be further associated with a cybersecurity risk. For example, a user account may be associated with a weak password. As another example, a resource may be associated with a misconfiguration, such as a database which is not password protected. In an embodiment, a cybersecurity risk may be represented as a node in the security graph 136. In some embodiments, a cybersecurity risk may be stored as metadata, data, and the like, of the detected node.

Figure 2:
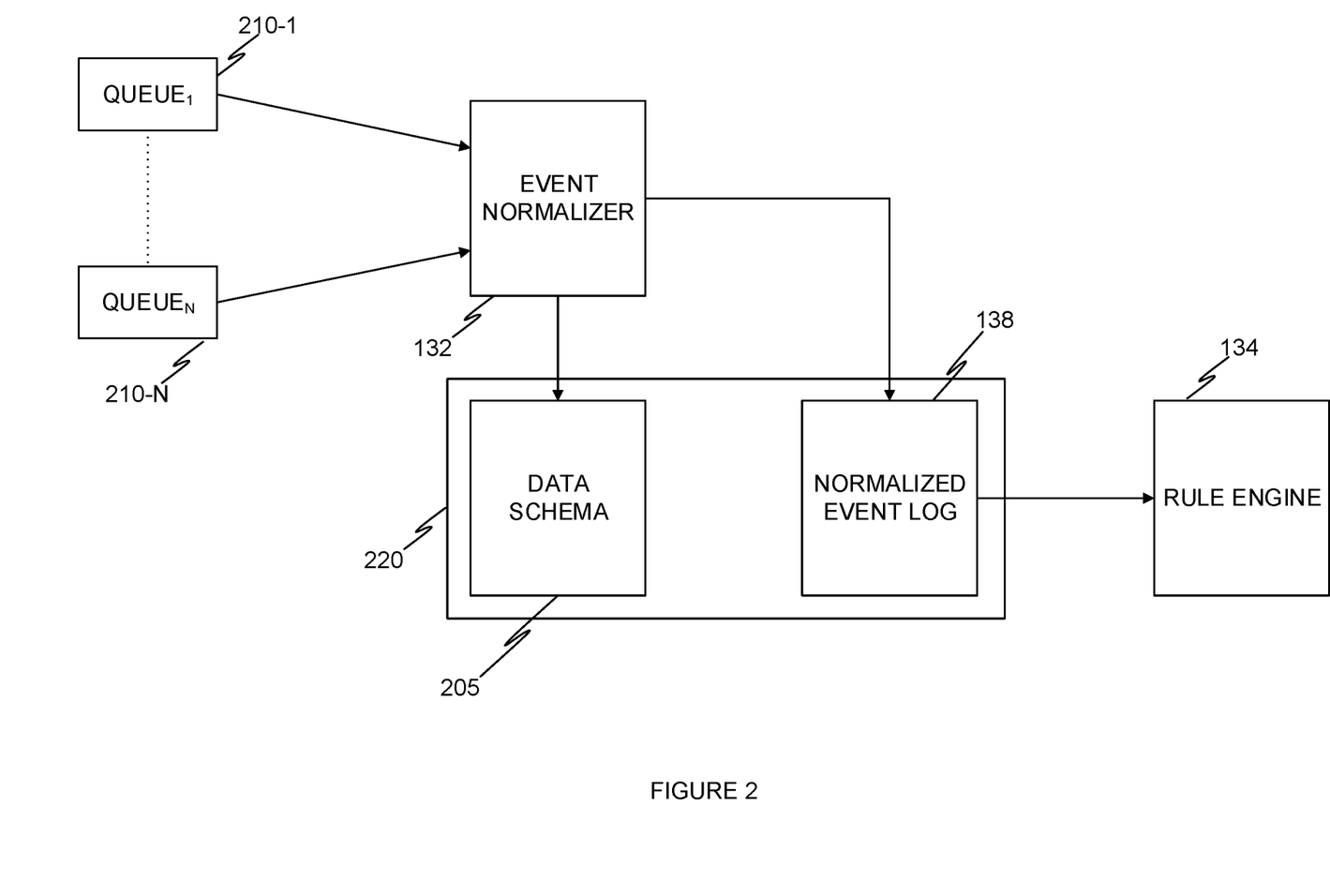
FIG. 2 is a diagram of an event flow through an event log normalizer, implemented in accordance with an embodiment.

FIG. 2 is an example diagram of an event flow through an event log normalizer, implemented in accordance with an embodiment. A log normalizer 132 is configured to receive events from a plurality of queues 210-1 through 210-N, generally referred to as queues 210 and individually as queue 210, where 'N' is an integer having a value of '2' or greater. For example, a queue 201 may be implemented as an Amazon® Simple Queue Service (SQS). In certain embodiments, a queue 210 may be implemented as an event stream, such as Amazon® Kinesis Data Stream.

The log normalizer 132 is configured to access a data schema 205. In an embodiment, the data schema 205 is realized as part of a database storing thereon a normalized event log, such as normalized event log 138. In certain embodiments, the data schema 205 includes predefined data fields, such as a resource identifier, a user account identifier, a service account identifier, an action identifier, a network address, a namespace identifier, a time stamp, additional information field, on an identifier of a cloud computing environment, an identifier of a cloud computing infrastructure, and the like.

In an embodiment, the log normalizer 132 is configured to extract data from an event received through a queue 210 and generate a normalized event based on the data schema 205. In certain embodiments, the log normalizer 132 is configured to generate a normalized event from a plurality of received events.

In certain embodiments the log normalizer 132 is configured to write the generated normalized event to a normalized event log 138. In an embodiment, the normalized event log 138 is stored in a transactional database 220 having the properties of atomicity, consistency, isolation and durability (ACID properties).

In some embodiments, the normalized event log 138 is provided to a rule engine 134. In some embodiments, a generated normalized event is provided to the rule engine 134 and written to the normalized event log 138. Providing the normalized event log 138 to the rule engine 134 allows applying rules of the rule engine 134 equally and consistently to all events generated from multiple different cloud environments. This is advantageous as it reduces, for example, redundant rule engines each having corresponding rules to other rule engines, all managed by a single organization for each cloud computing environment of the organization. By having a single point where rules are applied through a rule engine 134, maintenance of the rule engine is significantly reduced. Rule updates need only occur on a single engine, thus reducing points of failure.

Figure 3:
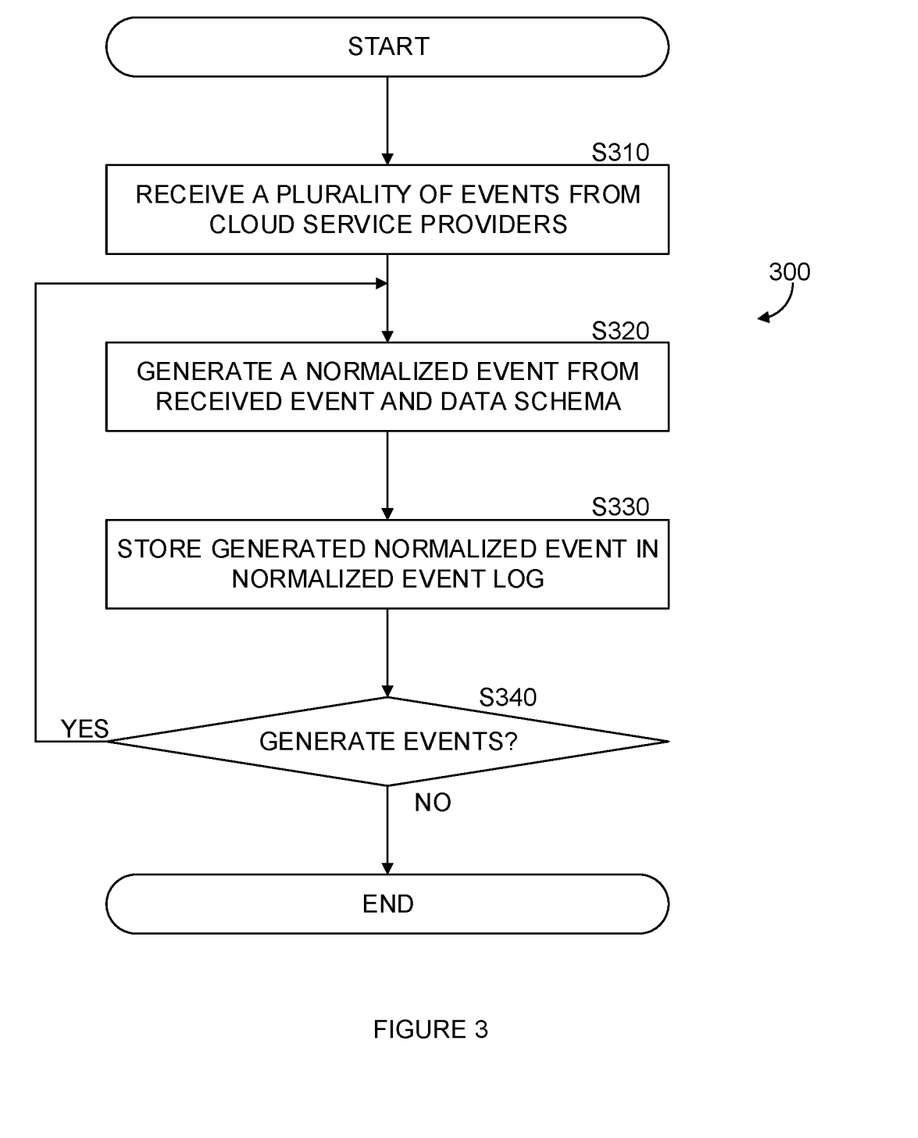
FIG. 3 is a flowchart of a method for generating a normalized event log from a plurality of cloud service providers, implemented in accordance with an embodiment.

FIG. 3 is an example flowchart 300 of a method for generating a normalized event log from a plurality of cloud service providers, implemented in accordance with an embodiment. A cloud service provider (CSP) provides cloud services from a single cloud computing infrastructure. CSPs may also not wish to natively provide a solution which is able to communicate across multiple platforms as it would require a CSP to integrate, at least on some level, with a competitor platform. However, from an organization's perspective, which utilizes multiple offerings from different CSPs, it is advantageous to be able to have a single, unified, event log, where events from all the multiple CSPs are provided for easy viewing, and where rules and controls can be applied equally and consistently.

At S310, a plurality of events are received. In an embodiment, the plurality of events includes an event from a first CSP utilizing a first cloud computing infrastructure (e.g., AWS) and an event from a second CSP utilizing a second cloud computing infrastructure (e.g., GCP). In certain embodiments, some events are received through a push queue, a pull queue, an event stream, and any combination thereof. For example, a first group of events from a first cloud computing infrastructure are received by accessing an event queue, while a second group of events from a second cloud computing infrastructure are received by accessing an event stream.

At S320, a normalized event is generated from a received event. In an embodiment, a normalized event is generated for each received event. In some embodiments, the normalized event is generated based on a data schema. In an embodiment, the data schema includes a data structure for an event. In some embodiments, data is extracted from the received event and the normalized event is generated based on extracted data and the data schema.

In some embodiments, a normalized event is generated for a group of received events. For example, a first received event may include generating a new user account, and a second received event may include providing the new user account with administrator privilege. The first received event and second received event may be used, in an embodiment, to generate a single normalized event corresponding to a new user account with administrator privilege being generated.

For example, a virtual machine deployed in a GCP cloud computing environment is configured to access a Cloud Logging application programming interface (API) and generate an event by providing data which is then recorded as an event in a log, through a specified sink. The data is received by the Cloud Logging API and routed to a sink according to the specification provided by the virtual machine. In an embodiment, a sink is associated with a cloud resource. A sink routes a log event to a log bucket. In an embodiment, a log bucket is a virtual storage. In certain embodiments, a service account is generated in a cloud computing environment for each sink, and the service account initiates writing of log events to the sink associated with the service account. In an embodiment an event normalizer is configured to access the Cloud Logging API and read a logged event, for example stored in a bucket. A normalized event is generated, in an embodiment, by extracting data from the logged event, generating a data record according to a predefined data schema, and populating the generated record with the extracted data. The generated record is then stored as a normalized event.

As another example, a virtual machine deployed in a cloud computing environment hosted on AWS, such as Amazon® Elastic Compute Cloud (EC2) includes a log agent. In an embodiment the log agent is deployed on the virtual machine when the virtual machine is provisioned by an orchestrator of the cloud computing environment. The log agent may be implemented as an executable software application which, when executed by the virtual machine, monitors actions performed by the virtual machine and generates log events, which include records of actions performed. For example, a record can include an identifier of an action and a time stamp. The record is sent to an Amazon® CloudWatch Logs destination. In an embodiment the record is provided to Amazon® Kinesis Data Streams, where an AWS Lambda function can write the record to an Amazon® Simple Storage Service (S3), from which it can be retrieved.

In an embodiment an event normalizer is configured to access S3 and read the record. A normalized event is generated, in an embodiment, by extracting data from the record, generating a data record according to a predefined data schema, and populating the generated record with the extracted data. The generated record is then stored as a normalized event.

It is noted that for the examples above, a human operator may configure a system to access event logs in different computing environments and extract data from records, and manually enter the data into a normalized event log. However in this regard, it is also worth noting that such event logs are regularly stored as petabytes of data, and that processing the data must occur within a time frame that a human is incapable of processing as the raw data is often stored only for a limited time. While multiple humans may be assigned to this task, humans are known to be unreliable in repetitive tasks, i.e., receiving event logs where events may differ slightly, appropriately and consistently applying a predefined data schema to each element of extract data from each event, and with such a high volume of data requiring processing, errors are likely to happen.

By contrast, by configuring a system to perform the method as described herein, a normalized event log can be generated which consistently applies a predefined data schema, and does not introduce errors due to personal discretion, bias, fatigue, and the like conditions which plague human operators. An event log must be a reliable reflection of actions performed in a cloud computing environment, anything less than reliable greatly diminishes the value of having such information.

At S330, the normalized event is stored in a normalized event log. In an embodiment, the normalized event log is stored on a transactional database. In some embodiments, the transactional database includes the data schema, based upon which normalized events are generated. In certain embodiments, the normalized event, normalized event log, and a combination thereof, are provided to a rule engine. Optionally, a rule is applied to the normalized event. In an embodiment, satisfaction of a condition of a rule is an indication of a cybersecurity event.

At S340, a check is performed to determine if an additional normalized event should be generated. In an embodiment, if 'yes' execution continues at S320. In certain embodiments, if 'no', a check may be performed to further determine if an additional event should be received. If 'yes' execution continues at S310. In some embodiments, if either check returns 'no' execution terminates.

Figure 4:
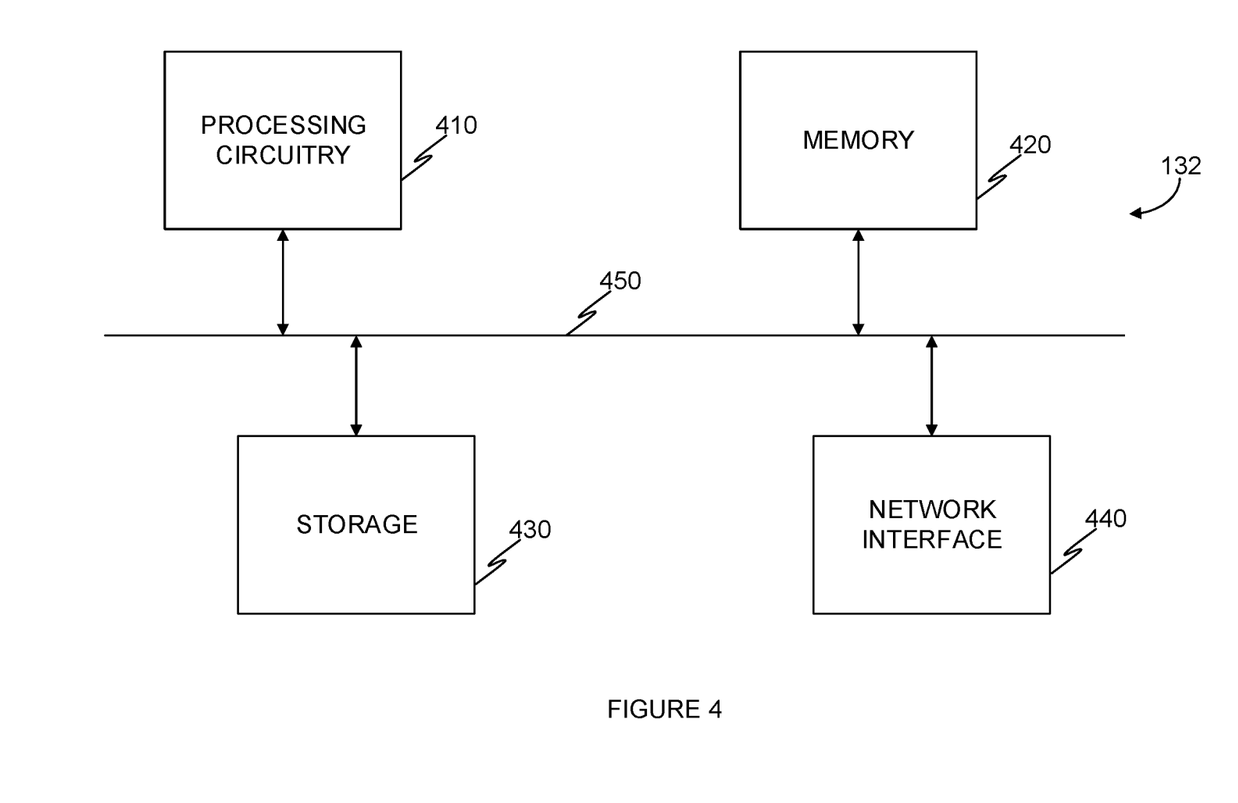
FIG. 4 is schematic diagram of a log normalizer according to an embodiment.

FIG. 4 is an example schematic diagram of a log normalizer 132 according to an embodiment. The log normalizer 132 (also referred to as normalizer 132) includes a processing circuitry 410 coupled to a memory 420, a storage 430, and a network interface 440. In an embodiment, the components of the normalizer 132 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the normalizer 132 to communicate with, for example, an inspection environment 130, a security graph, a database for storing a normalized event log, and the like.

It should be understood that the embodiments described herein are not limited to the specific architecture illustrated in FIG. 4, and other architectures may be equally used without departing from the scope of the disclosed embodiments. Furthermore, other workloads described herein such as the security graph, normalized event log database, and the like, may be implemented, in an embodiment, on a computing architecture similar or equal to the one discussed in FIG. 4.

Figure 5:
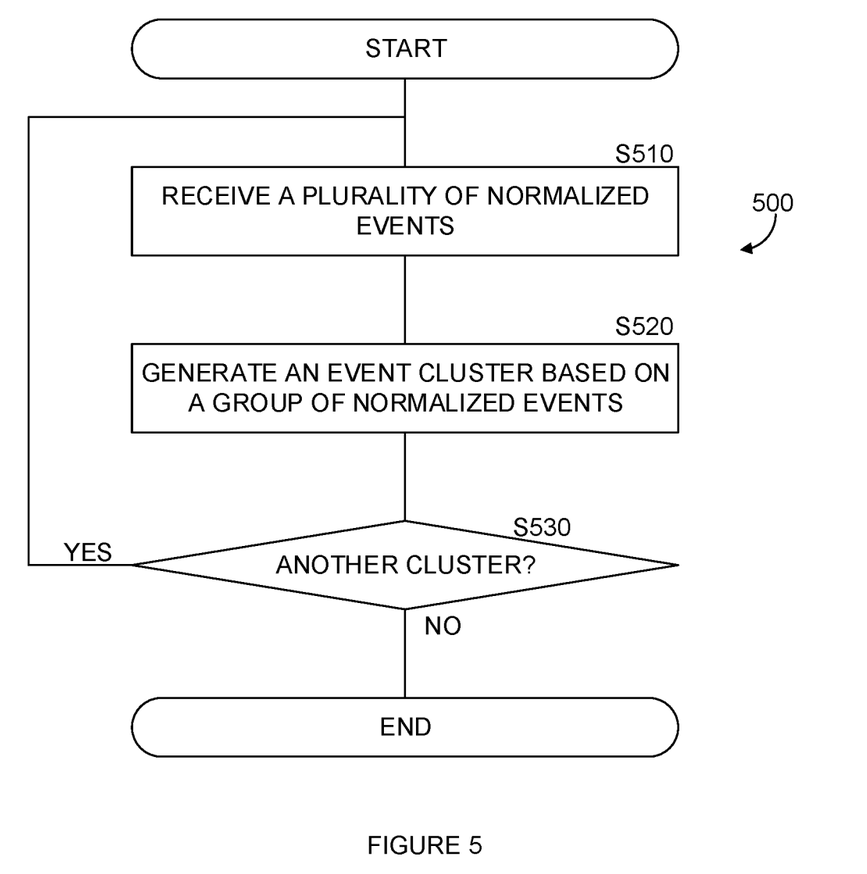
FIG. 5 is a flowchart of a method for detecting an event cluster from a normalized event log, implemented in accordance with an embodiment.

FIG. 5 is an example of a flowchart of a method for detecting an event cluster from a normalized event log, implemented in accordance with an embodiment. An advantage provided by a normalized event log is the ability to detect an event cluster, which is based on a plurality of received events. Received events are used to generate normalized events, for example as detailed above. In an embodiment, a portion of the normalized events are clustered into an event cluster.

At S510, a plurality of normalized events are received. In an embodiment a normalized event is generated based on a received event and according to a data schema. An example of a method for generating a normalized event is discussed in more detail above. In an embodiment, a normalized event includes a data attribute (or data field), such as: a resource identifier, a user account identifier, a service account identifier, an action identifier, a network address, a namespace identifier, a time stamp, additional information field, on an identifier of a cloud computing environment, an identifier of a cloud computing infrastructure, and the like.

At S520, an event cluster is generated. In an embodiment, the cluster is generated from a group of the plurality of normalized events, based on a data attribute (or data field) of the normalized event having a same value. For example, the cluster may be based on a value of: a resource identifier, a user account identifier, a service account identifier, an action identifier, a network address, a namespace identifier, a time stamp, additional information field, on an identifier of a cloud computing environment, an identifier of a cloud computing infrastructure, a combination thereof, and the like.

In an embodiment, a first normalized event of the event cluster is from a first cloud computing environment, and a second normalized event of the event cluster is from a second cloud computing environment, which is not the first cloud computing environment. In some embodiments, an event cluster may trigger a rule, which each of the events which comprise the event cluster would not trigger on their own.

For example, a first normalized event indicates a service account performs a data access in a first cloud computing environment. A second normalized event indicates that the service account assumes a role, e.g., using AssumeRole in AWS, in a second cloud computing environment. A third normalized event indicates that the service account writes data to the second cloud computing environment. In aggregate, these three events form together an event cluster, for example based on the service account, which indicates that a cross-cloud platform operation occurred. When viewed on their own these events lack context, but when clustered and presented together, a single action (or session) is apparent.

At S530, a check is performed to determine if another event cluster should be generated. In an embodiment, if additional normalized events exist, an event cluster may be generated. In certain embodiments, if another event cluster should be generated execution continues at S510 to receive additional normalized events which can be clustered to an event cluster. In other embodiments, if another event cluster should not be generated, execution may terminate.

In some embodiments, the disclosed techniques provide an improved cloud detection and response (CDR) technique. In an embodiment, a CDR system provides the ability to detect threats in a cloud computing environment and respond to those threats. Specifically, the disclosed techniques improve the ability to detect threats by generating a normalized event log. A normalized event log allows increased visibility into actions occurring on a single cloud platform, and allows visibility into cross-cloud platform solutions, which is not previously available. Cross-platform events may be seen as insignificant when viewed individually (i.e., only within the context of their native cloud) but when viewed in the context of another event from another cloud platform allow detection of cross-platform threats which are otherwise not visible.

Furthermore, response time to cybersecurity threats is improved. This is due to the normalized log reducing detection time. For example, without cross-platform event detection, it can take a human operator several weeks to find an event in one cloud platform and link it to an event in another cloud platform. By utilizing the normalized event log, a single rule engine can be utilized to detect cybersecurity events from normalized events. For example, when a detection rule is applied to a normalized event, triggering of the rule (e.g., a data field of the normalized event has a value which satisfies a condition of the rule) indicates that a cybersecurity threat is detected. In some embodiments, a remedial action, mitigation action, and the like, are initiated in response to a triggering a rule which detects a cybersecurity threat. In an embodiment, a mitigation action is generating a notification that a cybersecurity threat is detected.

In an embodiment, providing a normalized event log may be performed in place of, or in tandem with, applying machine learning (ML) and artificial intelligence (AI) techniques. ML and AI techniques often attempt to perform anomaly detection from seemingly unrelated data, in the context of CDR, in order to recognize events which correspond to the behavior of an attacker. However, a drawback of these techniques is that they are not transparent and may not be consistent (i.e., an AI model receiving the same input a second time will not necessarily generate the same output as the first time). This means that an AI model which processes events may detect a threat based on an input, and detect no threat based on the same input, without providing an explanation. This lack of predictability is not desirable in cybersecurity, where predictability and consistency are important.

A normalized event log therefore, on which a rule engine can be applied, is desirable where transparency is warranted. Rules are applied equally and consistently and can be monitored, changed, updated, and the like, as needs arise, from a single point.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for improving cloud detection and response (CDR) by generating a normalized event log from a plurality of cloud service providers (CSPs), comprising:
   receiving a plurality of events as an event stream, wherein a first event of the plurality of events is generated in a cloud computing environment provided by a first CSP and a second event of the plurality of events is generated in a cloud computing environment provided by a second CSP;
   generating a first normalized event based on data extracted from the first event and further based on a predefined data schema, the predefined data schema including a plurality of data fields;
   generating a second normalized event based on data extracted from the second event and further based on the predefined data schema;
   storing the normalized events in a transactional database having stored therein a normalized event log;
   applying a rule from a rule engine on the normalized events stored in the transactional database to detect a cybersecurity threat in any of the plurality of CSPs;
   extracting from a normalized event stored in the transactional database an identifier of a cloud entity;
   traversing a security graph to detect a node representing the cloud entity;
   determining that the detected node is associated with a cybersecurity risk; and
   generating an alert based on the cybersecurity risk and the detected cybersecurity threat.

2. The method of claim 1, wherein the normalized event is based on data extracted from a plurality of received events.

3. The method of claim 1, further comprising:
   triggering a condition of the rule by determining that a value of a data field of the normalized event matches the condition.

4. The method of claim 1, wherein the normalized event is based on extracted data from the first event and extracted data from the second event.

5. The method of claim 1, wherein the predefined data schema includes an attribute which is any one of: a resource identifier, a user account identifier, a service account identifier, an action identifier, a network address, a namespace identifier, a time stamp, additional information field, an identifier of a cloud computing environment, and an identifier of a cloud computing infrastructure.

6. The method of claim 1, wherein the plurality of events are received from any one of: a queue and a combination thereof.

7. The method of claim 1, further comprising:
   generating a unique normalized event corresponding to each unique event of the received plurality of events.

8. The method of claim 1, further comprising:
   generating an event cluster including a first normalized event and a second normalized event, based on any one of: a data field of the predefined data schema, a value of a data field of the predefined data schema, and any combination thereof.

9. The method of claim 8, wherein the first normalized event corresponds to an event from the cloud computing environment provided by the first CSP and the second normalized event corresponds to an event from the cloud computing environment provided by the second.

10. A non-transitory computer readable medium having stored thereon instructions for causing a processing circuitry to execute a process improving cloud detection and response (CDR) by generating a normalized event log from a plurality of cloud service providers (CSPs), the process comprising:
    receiving a plurality of events as an event stream, wherein a first event of the plurality of events is generated in a cloud computing environment provided by a first CSP and a second event of the plurality of events is generated in a cloud computing environment provided by a second CSP;
    generating a first normalized event based on the extracted data extracted from the first event and further based on a predefined data schema, the predefined data schema including a plurality of data fields;
    generating a second normalized event based on data extracted from the second event and further based on the predefined data schema;
    storing the normalized events in a transactional database having stored therein a normalized event log;
    applying a rule from a rule engine on the normalized events stored in the transactional database to detect a cybersecurity threat in any of the plurality of CSPs;
    extracting from a normalized event stored in the transactional database an identifier of a cloud entity;
    traversing a security graph to detect a node representing the cloud entity;
    determining that the detected node is associated with a cybersecurity risk; and
    generating an alert based on the cybersecurity risk and the detected cybersecurity threat.

11. A system for improving cloud detection and response (CDR) by generating a normalized event log from a plurality of cloud service providers (CSPs), comprising:
    a processing circuitry; and
    a memory, the memory containing instructions that, when executed by the processing circuitry, configure the system to:
    receiving a plurality of events as an event stream, wherein a first event of the plurality of events is generated in a cloud computing environment provided by a first CSP and a second event of the plurality of events is generated in a cloud computing environment provided by a second CSP;
    generate a first normalized event based on data extracted from the first event and further based on a predefined data schema, the predefined data schema including a plurality of data fields;
    generate a second normalized event based on data extracted from the second event and further based on the predefined data schema;
    store the normalized events in a transactional database having stored therein a normalized event log;
    apply a rule from a rule engine on the normalized events stored in the transactional database to detect a cybersecurity threat in any of the plurality of CSPs;
    extract from a normalized event stored in the transactional database an identifier of a cloud entity;
    traverse a security graph to detect a node representing the cloud entity;
    determine that the detected node is associated with a cybersecurity risk; and
    generate an alert based on the cybersecurity risk and the detected cybersecurity threat.

12. The system of claim 11, wherein the normalized event is based on data extracted from a plurality of received events.

13. The system of claim 11, wherein the memory contains further instructions which when executed by the processing circuitry further configure the system to:
    trigger a condition of the rule by determining that a value of a data field of the normalized event matches the condition.

14. The system of claim 11, wherein the normalized event is based on extracted data from the first event and extracted data from the second event.

15. The system of claim 11, wherein the predefined data schema includes an attribute which is any one of: a resource identifier, a user account identifier, a service account identifier, an action identifier, a network address, a namespace identifier, a time stamp, additional information field, an identifier of a cloud computing environment, and an identifier of a cloud computing infrastructure.

16. The system of claim 11, wherein the plurality of events are received from any one of: a queue, an event stream, and a combination thereof.

17. The system of claim 11, wherein the memory contains further instructions which when executed by the processing circuitry further configure the system to:
    generate a unique normalized event corresponding to each unique event of the received plurality of events.

18. The system of claim 11, wherein the memory contains further instructions which when executed by the processing circuitry further configure the system to:
    generate an event cluster including a first normalized event and a second normalized event, based on any one of: a data field of the predefined data schema, a value of a data field of the predefined data schema, and any combination thereof.

19. The system of claim 18, wherein the first normalized event corresponds to an event from the cloud computing environment provided by the first CSP and the second normalized event corresponds to an event from the cloud computing environment provided by the second.

\* \* \* \* \*